J. DAVIS.
PROCESS OF DEHYDRATING SODIUM SULFATE CRYSTALS.
APPLICATION FILED AUG. 5, 1910.
990,116.
Patented Apr. 18, 1911.
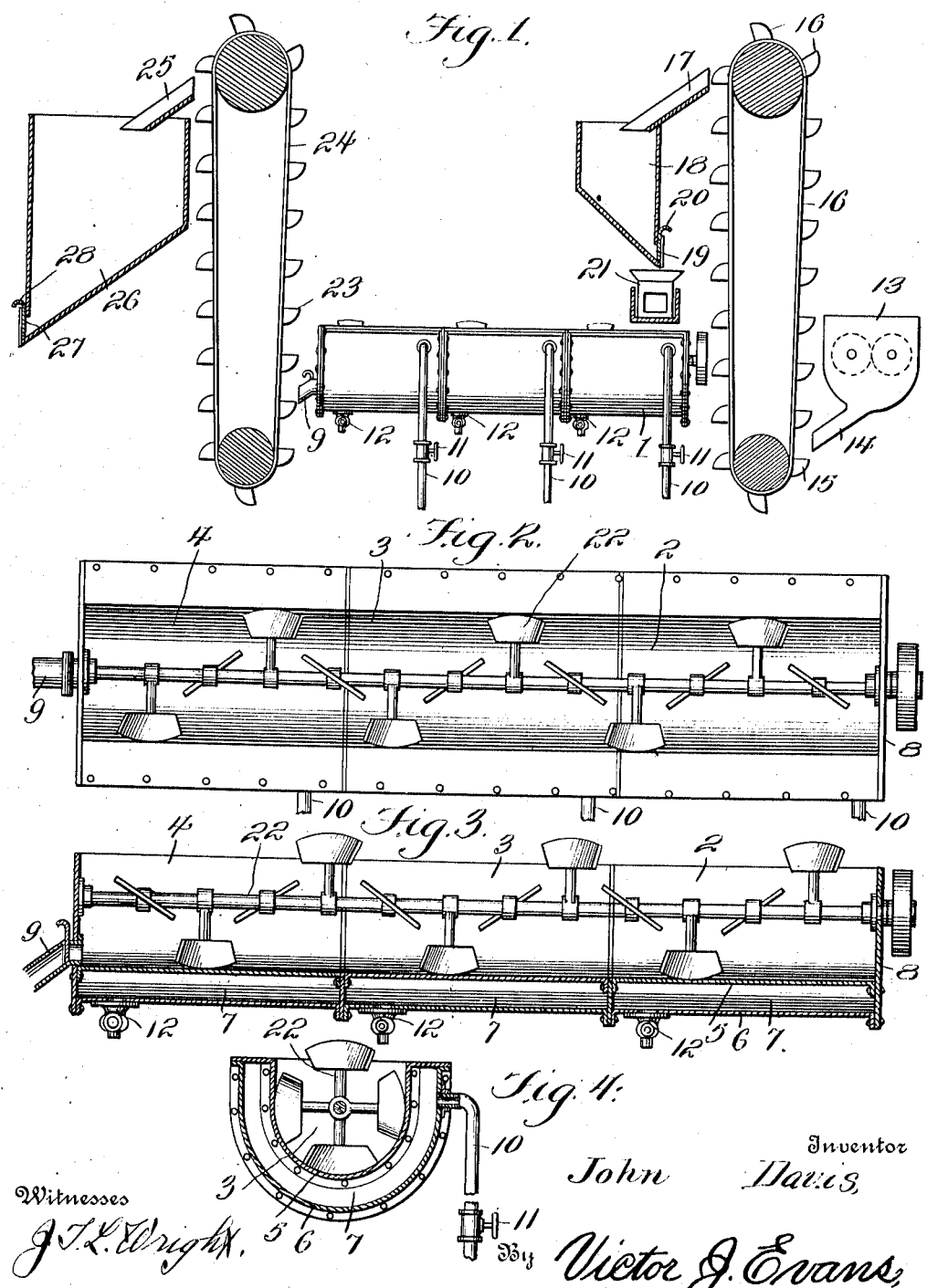
Witnesses
J. T. L. Wright
C. C. Hines
Inventor
John Davis,
By Victor J. Evans,
Attorney

UNITED STATES PATENT OFFICE.

JOHN DAVIS, OF LARAMIE, WYOMING.

PROCESS OF DEHYDRATING SODIUM-SULFATE CRYSTALS.

990,116.   Specification of Letters Patent.   Patented Apr. 18, 1911.

Application filed August 5, 1910. Serial No. 575,667.

*To all whom it may concern:*

Be it known that I, JOHN DAVIS, a citizen of the United States, residing at Laramie, in the county of Albany and State of Wyoming, have invented new and useful Improvements in Processes of Dehydrating Sodium-Sulfate Crystals, of which the following is a specification.

This invention relates to a process of dehydrating and utilizing natural hydrated sulfate of soda in the manufacture of glass and in the production of other sodium salts, such as caustic soda, carbonate of soda, sal soda, bicarbonate of soda, etc.

The natural sulfate of soda referred to is a hydrate found in large quantities in Wyoming and other sections of the United States, and consists of a highly pure crystallized sodium sulfate containing from 50% to 60% of water. At a temperature of from 100° to 150° F. the crystals dissolve in their water of crystallization, forming a liquid which must be stored against loss in stout iron vessels, and which cannot be commercially used in any of the customary ways. Attempts have been made to render this substance commercially available by a drying out process in reverberatory furnaces and subsequently calcination, but this process has been found impracticable on account of its prohibitive cost.

The object of the present invention is to provide a process whereby such natural sulfate of soda may be easily and economically dehydrated and recovered or used in the manufacture of glass or in the production of any of the sodium salts made from sodium sulfate.

In the accompanying drawings:—Figure 1 is an elevational view, partially in section, of a form of apparatus which may be used in carrying my process into practice. Fig. 2 is a top plan view of the drier. Fig. 3 is a longitudinal section through the drier. Fig. 4 is a transverse section through one of the drier sections.

Referring to the drawing for a more complete description of the apparatus, 1 designates a drier comprising a longitudinal trough of any desired length and consisting of a series of sections placed end to end and suitably coupled together. In the present illustration, the drier is shown as composed of three sections 2, 3 and 4, each approximately of semi-circular form and composed of spaced semi-circular plates 5 and 6, the inner section 5 forming a channel to receive the material to be dried and the outer section 6 an external steam space, chamber or jacket 7, closed at its top and ends in any suitable manner. The outer end of the primary section 2 is closed by an end wall 8 against the escape of material at this point, and the abutting ends of the sections are flanged and bolted or riveted together so that while the channels of the sections will communicate to form the longitudinal trough or passage the steam chambers or jackets of the several sections will be closed against communication with each other. The rear or delivery section 4 is provided with a delivery chute 9, and the inlet end of the steam jacket of each section is in communication with a steam supply pipe 10 having a controlling valve 11, while the rear or delivery end of each section is provided with an outlet 12 for the exhaust of the steam and water of condensation, which outlet may be check-valved to confine the steam to a determined degree so that as large a proportion of the heat as possible may be utilized.

Arranged adjacent the primary section of the drier is a suitable mixer 13 having a delivery spout 14 disposed to discharge the mixed material into the buckets 15 of a conveyer 16, by which the material is elevated and discharged through a chute 17 into a supply bin 18 having an outlet 19 controlled by a suitable gate 20. The material discharging through the outlet 19 passes into an automatic feeder 21, by which the material is deposited into the primary section of the drier. Arranged within the drier is a combined mixer or agitator and feeder 22 by which the material is fed along the trough from the primary to the delivery section and discharged through the outlet 9, and by which the material in its passage is also thoroughly agitated or stirred and loosened up so as to be effectually heated throughout on its passage through the drier to evaporate the moisture contained therein. The discharge chute 9 is arranged to deliver the dried material into the buckets 23 of a conveyer 24, whereby the dried material is elevated and discharged through a chute 25 into a storage bin 26 having an outlet 27 controlled by a gate 28, from which bin the material may be returned to the primary section of the drier to be subjected to a second course of drying or discharged into the furnace for conversion into glass or one of the aforesaid sodium salts. The steam jackets or heaters of the drier sections are closed against communication with each other in order that steam of different temperatures and pressures may be supplied thereto through the pipes 10, whereby the mass may be first subjected to a comparatively low temperature and then to progressively increasing temperatures as it is fed through the drier to secure a more thorough and perfect expulsion of the moisture.

In carrying the method into practice, a suitable amount of hydrated sulfate of soda is combined in the mixer 13 with a proper proportion of solid, comminuted porous or absorbent vehicle, which is fed in the described manner to the primary section of the drier and then through the drier by the action of the feeder 22. As the mixture passes through the drier the mass is thoroughly agitated by the feeder and heater to constantly higher degrees by the steam jackets, whereby the water contained in the mass is gradually evaporated until when the mixture is ready for discharge through the outlet 9, all the moisture is expelled the mixture as a whole thoroughly dried and the sulfate of soda hydrated. It will be understood that under the comparatively low temperature of heat in the primary section 2 of the drier, the crystals are dissolved in their water of crystallization, forming a fluid which would otherwise be difficult to treat, except under very high temperatures, for the expulsion of the moisture, but by commingling this fluid with a solid, comminuted porous or absorbent vehicle, the fluid is distributed throughout the mass of the vehicle, and may consequently be more readily evaporated, so that at the completion of the course of drying treatment a solid mass will be left, consisting of the vehicle and dry or dehydrated sodium sulfate crystals. At this stage the dehydrated sodium sulfate may be separated from the vehicle by a dry or chemical process of separation in any suitable way, and any suitable vehicle for this purpose may be employed, but I prefer in practice to combine the hydrate with a vehicle consisting of the ingredients which are to be employed therewith for conversion under fusion into glass or one of the sodium salts ordinarily made from sodium sulfate, so that through one and the same course of treatment the hydrate may be dried or dehydrated and the components of the vehicle also properly dried to prepare the mass for introduction into the conversion furnace without subsequent treatment.

In carrying my invention into practice for the manufacture of glass, for instance, the hydrate is mixed with a vehicle consisting of sand and lime or any of the other materials commonly used in combination with soda for the production of a batch. A combination of sand in the proportion of 100 lbs. to 35 lbs. of lime and 40 lbs. of the previously ground hydrate provides an efficient mixture, the quantity of hydrate being doubled over a process employing dehydrated sulfate of soda, to make allowance for about 50%, by weight, of moisture. Through the course of treatment described the moisture contained in the mass will be expelled, forming a charge ready for the furnace into which it may be directly introduced without further treatment. It will thus be seen that the vehicle used performs the double service of a carrier for holding and distributing the moisture so that it can be readily evaporated and as elements which will chemically combine with the soda for the production of glass. In the preparation of the hydrate for conversion into any of the other salts of sodium, the vehicle may similarly consist of those ingredients commonly combined under fusion with sulfate of soda for its conversion into the desired salt. As an example, in the production of a "black ball" batch for the manufacture of carbonate of soda, the vehicle may consist of lime stone and fine coal which may be mixed with the previously ground hydrate in the proportions (for an ordinary revolving furnace) of 28 hdt. of the lime of stone to 19 hdt. of the coal and 30 hdt. of the hydrate, proper allowance being made for the amount of moisture contained in the last. By subjecting this mixture to the drying action described, the moisture will be expelled and the mixture will then be ready for introduction into the carbonating furnace.

It will accordingly be understood that by means of my process natural hydrated sulfate of soda containing a high percentage of moisture may be made commercially available at a comparatively low cost and that the process may, as a matter of fact, be employed in lieu of the usual process of drying the sand or any of the other vehicular ingredients prior to use.

Having thus described the invention, I claim:

1. The herein-described process of dehydrating sodium sulfate crystals, which consists in admixing the crystals with a porous vehicle of a character incapable of dissolving in the melted crystals at temperatures sufficient to evaporate the moisture and in quantity sufficient to prevent the formation of a fluid mass when heated at such temperatures, agitating the mixture, and heating the mixture while under constant agitation at a temperature sufficiently high to evaporate the moisture and sufficiently low to prevent the melting of the vehicle.

2. The herein-described process of dehydrating sodium sulfate crystals, which consists in admixing the crystals with a porous vehicle of a character incapable of dissolving in the melted crystals at temperatures sufficient to evaporate the moisture and in quantity sufficient to prevent the formation of a fluid mass when heated at such temperatures, agitating the mixture, and heating the mixture to gradually increasing temperatures while under constant agitation to a degree sufficiently high to evaporate the moisture and sufficiently low to prevent the melting of the vehicle.

3. The herein-described process of dehydrating sodium sulfate crystals, which consists in admixing the crystals with a solid comminuted absorbent vehicle of a character incapable of dissolving in the melted crystals at temperatures sufficient to evaporate the moisture and in quantity sufficient to prevent the formation of a fluid mass when heated at such temperatures, conveying the mixture through a course of travel, and heating the mixture along its path of travel at a temperature sufficiently high to evaporate the moisture and sufficiently low to prevent the melting of the vehicle.

4. The herein-described process of dehydrating sodium sulfate crystals which consists in mixing the crystals with a porous vehicle of a character incapable of dissolving in the melted crystals at temperatures sufficient to evaporate the moisture and in quantity sufficient to prevent the formation of a fluid mass when heated at such temperatures, conveying the mixture through a course of travel, stirring or agitating the mixture during its course of travel, and heating the mixture during its course of travel at a temperature sufficiently high to evaporate the moisture and sufficiently low to prevent the melting of the vehicle.

5. The herein-described process of dehydrating sodium sulfate crystals, which consists in mixing the crystals with a solid comminuted absorbent vehicle incapable of dissolving in the melted crystals at temperatures sufficient to evaporate the moisture and in quantity sufficient to prevent the formation of a fluid mass when heated at such temperatures, conveying the mixture through a course of travel, stirring or agitating the mixture during its course of travel at a temperature sufficiently high to evaporate the moisture and sufficiently low to prevent the melting of the vehicle.

6. The herein-described process of dehydrating sodium sulfate crystals and preparing the same for use in the production of another substance, which consists in mixing the crystals with an absorbent vehicle incapable of melting and dissolving in the melted crystals at temperatures sufficiently low to evaporate the moisture and in quantity sufficient to prevent the formation of a fluid mass when heated at such temperatures but capable of melting and chemically combining with the dehydrated crystals at relatively higher temperatures to form the desired substance, and subjecting the mixture to heat below the melting point of the vehicle but sufficiently high to evaporate the moisture from the mixture.

7. The herein-described process of dehydrating sodium sulfate crystals and preparing the same for use in the production of another substance, which consists in mixing the crystals with an absorbent vehicle incapable of melting and dissolving in the melted crystals at temperatures sufficiently low to evaporate the moisture and in quantity sufficiently great to prevent the formation of a fluid mass when heated at such temperatures but capable of melting and chemically combining with the dehydrated crystals at relatively higher temperatures to form the desired substance, conveying the mixture through a course of travel, and subjecting the mixture during its course of travel to heat below the melting point of the vehicle but sufficiently high to evaporate the moisture from the mixture.

8. The herein-described process of dehydrating sodium sulfate crystals and preparing the same for use in the production of another substance, which consists in mixing the crystals with a solid comminuted absorbent vehicle incapable of melting and dissolving in the melted crystals at temperatures sufficiently low to evaporate the moisture and in quantity sufficiently great to prevent the formation of a fluid mass when heated at such temperatures but capable of melting and chemically combining with the dehydrated crystals at relatively higher temperatures to form the desired substance, conveying the mixture through a course of travel, agitating it in its course of travel, and subjecting the mixture during its course of travel to heat below the melting point of the vehicle but sufficiently high to evaporate the moisture from the mixture.

In testimony whereof I affix my signature in presence of two witnesses.

JOHN DAVIS.

Witnesses:
B. F. MILLER,
C. D. SPALDING.